United States Patent [19]

Hermeyer

[11] 3,854,096

[45] Dec. 10, 1974

[54] SELF-TRIGGERED CIRCUIT ARRANGEMENT FOR A MEASURING AMPLIFIER

[75] Inventor: Bernd Hermeyer, Hamburg-Schenefeld, Germany

[73] Assignee: U.S. Philips Corporation, New York, N.Y.

[22] Filed: July 13, 1972

[21] Appl. No.: 271,346

[30] Foreign Application Priority Data

July 17, 1971 Germany .......................... 2135921

[52] U.S. Cl. ................ 328/114, 250/402, 328/162, 330/149

[51] Int. Cl. .............................................. H05g 1/20

[58] Field of Search ............... 250/95, 93; 307/237; 328/114, 132, 162, 163, 165, 167; 330/149

[56] References Cited

UNITED STATES PATENTS 2,537,914 1/1951 Roop .................................. 250/95

*Primary Examiner*—James W. Lawrence
*Assistant Examiner*—C. E. Church
*Attorney, Agent, or Firm*—Frank R. Trifari; Bernard Franzblau

[57] ABSTRACT

Interference blanking circuit arrangements are adapted for special uses. In automatic X-ray exposure timers it is important to suppress the flash-overs in the tube occurring at high tube voltages and the resultant pulses and associated sequence pulses in such a manner that the subsequent circuit or the subsequent switch does not notice this interference blanking and that erroneous exposures are avoided in case of X-ray examination. An embodiment is shown.

5 Claims, 6 Drawing Figures

SELF-TRIGGERED CIRCUIT ARRANGEMENT FOR A MEASURING AMPLIFIER

Figure 1:
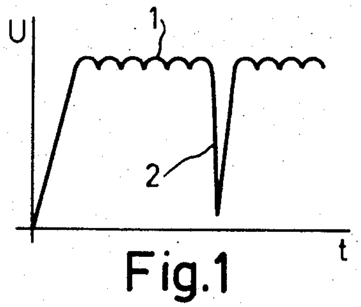

The invention relates to a self-triggered circuit arrangement for a measuring amplifier, particularly for an automatic exposure timer in X-ray examination equipment, including means to blank interference pulses whose rise time is shorter than the rise time of the desired signal and by which the output signal from the measuring amplifier is not noticeably influenced.

Circuit arrangements for blanking interference pulses are known, for example, from U.S. Pat. No. 2,058,296 or from the Magazine "Alta Frequenza", 36, August 1967, pages 726 to 731. These circuit arrangements relate, however, to so-called "separately triggered" arrangements and solve problems which are quite different from those to be solved by the circuit arrangement according to the present invention.

In X-ray examination equipment there is, for example, the problem of accurately measuring the X-ray quantity, which is incident on the X-ray film behind the patient, as a function of numerous parameters and of switching off the X-ray tube when a previously determined value is reached. In the X-ray technique such arrangements are referred to as automatic exposure timers.

These timers require an input signal which is provided by an ionisation chamber arranged in the path of the X-rays. This signal in the order of several mV to Volt must be processed reliably. The output of the automatic exposure timer may receive a pulse which drives a mechanical or electronic switch and discontinues the X-ray. However, it has hitherto been impossible to prevent flash-overs in the known X-ray tubes when very high voltages are used, which flash-overs occur for a short time only, but in the post-arranged circuit arrangement they cause this arrangement to respond to the short pulse so that a switch-off pulse is provided at the wrong instant.

It is an object of the invention to take steps with the aid of so-called self-triggered circuit arrangements for a measuring amplifier by which interference blanking within the measuring amplifier is effected so that the output signal from the amplifier of subsequent circuit-arrangements can be further processed without difficulty, i.e. the subsequent circuit arrangement or the subsequent switch does not notice that interference blanking is effected which means that the subsequent circuit arrangement does not respond at the instant when the interference pulse occurs and thus switches only when so desired.

Similar, though slightly different problems occur in so-called "electrocardiographic amplifiers" and are solved in a different manner, as is shown in the published German Pat. No. 2,035,422.

In this case the blanked interference pulses are applied to the input with reverse polarity and in this manner the input signal is reduced by the amount of interference. However, this is only effected with a finite delay time so that an interference pulse having a width equal to the delay time of the amplifier plus the delay time of the blanking circuit appears at the output of the amplifier. In the relatively slow processes in electrocardiography this interference has no significance. On the other hand, it is unpleasantly noticeable in fast-operating amplifiers.

In solving the above-mentioned object envisaged according to the invention it was not only necessary to realise interference blanking as such, but to simultaneously take steps to include the decay process involved in the circuit arrangement and stimulated by the interference pulse in the interference blanking process, that is to say, to extend blanking through a period in which such interfering signals occur together with their sequence signals.

According to the invention this object is achieved in a self-triggered circuit arrangement for a measuring amplifier of the kind described in the preamble in that the blanking circuit means consist of a differentiating member followed by a multistage switching amplifier, an RC-member for pulse stretching and an output stage for separating or short-circuiting the output stages of the measuring amplifier. The differentiating member may consist of a capacitor followed by a transistor common base stage.

The circuit arrangement according to the invention is the first to make it possible to prevent, in a reliable and safe manner, the X-ray tube voltage from being switched off by a voltage flash-over in the X-ray tube and the resultant pulse in fully electronic automatic exposure timers for X-ray examination equipment.

Also for the so-called "cold tube" which in this condition readily leads to flash-overs at comparatively high voltages the circuit arrangement is likewise suitable and as a result of this safely operating automatic exposure timer the physician will get X-rays with the desired optical density.

Embodiments of the invention are shown in the drawing and are further described hereinafter.

Figure 2:
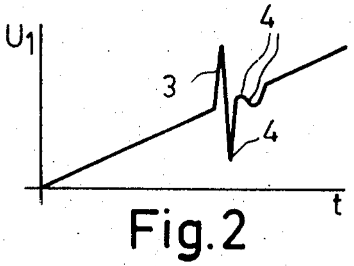
Figure 3:
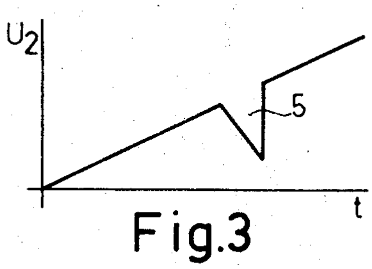
Figure 4:
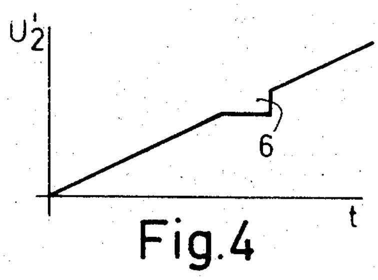
Figure 5:
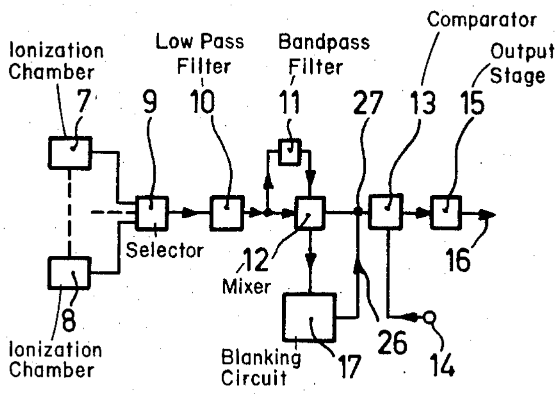
Figure 6:
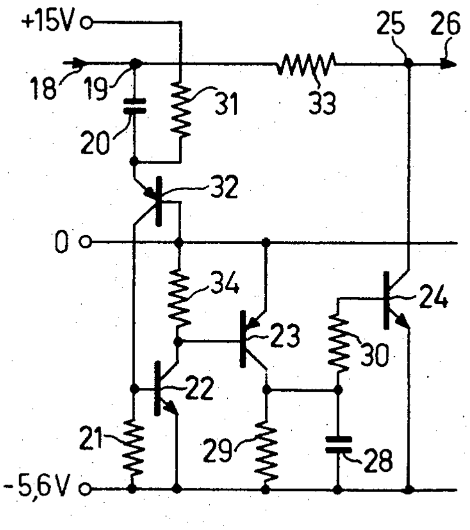

FIG. 1 shows the high voltage of an X-ray tube as a function of time,

FIG. 2 shows the input signal at the interference blanking circuit arrangement, FIG. 3 shows the output signal of the interference blanking in an arrangement for short-circuiting the following output stage of the measuring amplifier, FIG. 4 shows the same signal as that in FIG. 3 for the case where the subsequent stages of the measuring amplifier are separated, FIG. 5 shows a principle circuit diagram of an automatic exposure timer for X-ray examination equipment, and FIG. 6 shows the circuit arrangement in an embodiment according to the invention.

In FIG. 1 the blanking voltage U is plotted on the ordinate and the time $t$ is plotted on the abscissa. The characteristic curve shown represents the variation of the slightly wave-like direct voltage as shown, for example, at 1, and the needle pulse shown at 2 which results from a flash-over in the X-ray tube, the latter pulse is very short and amounts to, for example, fractions of a half-wave, i.e. shorter than 3 ms.

In the subsequent circuit arrangement a differentiation and integration is effected in addition to an inversion of the signal for measuring the exposure time and finally a signal is obtained which is plotted as $U_1$ as a function of time $t$ in FIG. 2. The voltage $U_1$ increases slowly and at the instant of occurrence of an interference signal, a signal 3 is obtained which also exhibits run-out oscillations 4. As is shown in FIG. 3 they are processed into a signal which is denoted by $U_2$ and, plotted as a function of time, has the variation shown in this Figure. The blanking space is denoted by 5.

FIG. 4 shows the same signal $U_2$, as a function of time $t$ having a different blanking space 6 for the case where the subsequent stages of the measuring amplifier are separated.

Finally FIG. 5 shows a block schematic diagram of an automatic exposure timer. The measuring points, i.e. the so-called ionisation chambers, are denoted by reference numerals 7 and 8 and are arranged in the X-ray path to be measured in an X-ray tube. A chamber selector 9 automatically connects the separate chambers to the measuring amplifier. The signal from this chamber selector 9 is first applied to a lowpass filter 10 whose cut-off frequency is chosen to be such that the steepest amplitude which may be, for example, 1 ms, of the chamber signal is passed undistorted. All higher interference frequencies are cut off. Subsequently the output signal from the low pass filter reaches the input of a bandpass filter 11 and a mixer stage 12 having a delay time. The delay time, may be, for example, 3 ms. The bandpass filter 11 is adjusted to the relevant ripple frequency of the high voltage, for example, to 100, 120, 300 or 360 Hz. Only these adjusted frequencies can pass the bandpass filter and leave it with a phase shift of 180°. Subsequently they are added to the measured signal in the mixer stage 12. As a result of the phase shift the voltages of these frequencies at the input of the mixer stage add to zero.

Finally the signal reaches a comparator 13 through a resistor provided at the output of mixer stage 12. In this comparator the signal is compared with an optical density voltage which is applied to terminal 14 and which is generally denoted by $U_{Ref}$. When the signal voltage exceeds the optical density voltage, a positive voltage step appears at the output of comparator 13. The output stage 15 finally converts this voltage step into a switch-off pulse which is applied to a time switch in the direction of the arrow 16.

In spite of all precautions, a great many interference pulses reach the input of the comparator 13 mainly due to the coupling onto the accumulative leads of the individual amplifiers so that voltage steps activating the time switch occur in the output signal.

According to the invention these unpleasant interference pulses are rendered harmless with the aid of interference blanking, namely in the interference blanking circuit arrangement 17 as is shown in FIG. 5. The input of comparator 13 may be either short-circuited or separated with the aid of this interference blanking circuit arrangement 17 for the duration of the interference pulse so that the interference pulses can no longer switch a trigger stage incorporated, for example, in comparator 13.

An embodiment of an interference blanking circuit arrangement 17 is shown in FIG. 6. Interference blanking has for its object to suppress the occurring positive voltage peaks which have a considerably steeper voltage rise than the steepest desired signal as is shown in FIG. 2. To this end the signal is applied to the circuit arrangement in the direction of arrow 18. A voltage rise at switching point 19 produces a shift current through capacitor 20 of the value $I=C\cdot(dU/dt)$. This current causes a voltage of the value $U_{R_{20}} = R_{20}\cdot C(dU/dt)$ at resistor 21. When this voltage exceeds the threshold voltage of the base-emitter diode of transistor 22, this transistor becomes conducting and likewise renders transistor 23 conducting. Transistor 23 renders transistor 24 conducting and this transistor 24 short-circuits the output 25 with respect to the voltage of, for example, −5.6 V and thus prevents the subsequent comparator 13 from responding because the arrow 26 has the same significance as arrow 26 in FIG. 5. The output signal at point 27 in the circuit arrangement according to FIG. 5 then exhibits a curve as is shown in FIG. 3. The resistor 33 prevents a feedback of the switching transistor 24 to the input (point 19) of the interference blanking circuit. It serves for decoupling the input and output of the guard circuits.

The interference pulses generally have a width of from 0.5 to 1 ms. As a result of the required low capacitance of capacitor 20 only the leading edges of the interference pulses would be blanked. To prevent this, a capacitor 28 is provided which operates as follows:

After transistor 22 is cut off again, capacitor 28 stores the voltage for a given period and is finally discharged across the two resistors 29 and 30. When the voltage at capacitor 28 has then decreased to a given value, for example, 0.7 V, transistor 24 is cut off and only then it enables (unblanks) the input to comparator 13. As a result the blanking period is extended by 0.5 ms and this period is sufficient to cover all sequence pulses located behind the interference pulse and being denoted by reference numeral 4 in the upper part of FIG. 2.

Resistor 31 provides a constant preliminary current in the emitter of transistor 32. As a result it is achieved that interference pulses in the order of the junction voltage of transistor 32 are also blanked.

Resistor 34 serves to cut off transistor 23, as otherwise there is the risk of transistor 23 becoming conducting as a result of the leakage currents in transistor 22.

What is claimed is:

1. In a measuring amplifier including input means for processing a desired signal and interference pulses whose rise time is shorter than the rise time of the desired signal and an output stage with its input coupled to the output of said input processing means, the improvement comprising a self-triggered blanking circuit including means for blanking interference pulses and comprising an input coupled to the output of the input processing means and an output coupled to the input of said measuring amplifier output stage, said blanking means comprising means for differentiating a signal received from said input processing means, a multistage switching amplifier coupled to said differentiating means and including an amplifier output stage with an RC pulse shaping circuit for extending the width of a pulse applied thereto, and means for coupling the output of said amplifier output stage to the input of said measuring amplifier output stage so as to prevent said measuring amplifier output stage from responding to an interference pulse supplied thereto by said input processing means.

2. A measuring amplifier as claimed in claim 1, characterized in that the differentiating means comprises a capacitor followed by a transistor common base stage.

3. A measuring amplifier as claimed in claim 1 wherein the input processing means of the measuring amplifier comprises a low pass filter coupled to the output of an ionization chamber of an X-ray tube, said measuring amplifier input processing means further comprising a mixer stage with its input coupled to said low pass filter and an output coupled to the input of said blanking means, and said measuring amplifier output stage includes a comparator with input means coupled to an output of the mixer stage and to the output of the amplifier output stage of the blanking means, and means for coupling a reference signal to a second input of said comparator.

4. A measuring amplifier as claimed in claim 1 wherein said multistage switching amplifier of the blanking means includes a transistor amplifier coupled to said differentiating means and arranged to switch states in response to an interference pulse and to supply a pulse type signal to said RC pulse shaping circuit, said RC circuit being connected to the input of said amplifier output stage to stretch said pulse type signal thereby to effectively extend its operative period.

5. A measuring amplifier as claimed in claim 1 wherein said output amplifier stage comprises a transistor amplifier connected across the input of said output stage and normally biassed into cut-off, said transistor amplifier being driven into conduction upon receipt of an interference pulse by said differentiating means thereby to short-circuit the input of the output stage of the measuring amplifier.

* * * * *